No. 620,334.  
B. G. LAMME.  
Patented Feb. 28, 1899.

DIRECT CURRENT SYSTEM OF ELECTRICAL DISTRIBUTION.

(Application filed Aug. 4, 1898.)

(No Model.)

WITNESSES:  
Ethan I. Dodds  
H. C. Tener

INVENTOR:  
Benjamin G. Lamme  
BY Wesley G. Carr  
ATTORNEY

THE NORRIS PETERS CO., PHOTO-LITHO., WASHINGTON, D. C.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

DIRECT-CURRENT SYSTEM OF ELECTRICAL DISTRIBUTION.

SPECIFICATION forming part of Letters Patent No. 620,334, dated February 28, 1899.

Application filed August 4, 1898. Serial No. 687,710. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Direct-Current Systems of Electrical Distribution, (Case No. 786,) of which the following is a specification.

My invention relates to direct-current systems of electrical distribution; and it has for its object to provide a method and means whereby a compound-wound generator may be advantageously regulated to supply the translating devices with the required amount of current in cases where some of such translating devices are near to and others remote from the generator, as well as in cases where all translating devices are approximately the same distance from the generator.

My invention is particularly useful as applied to isolated plants in which, for example, motors for running elevators or other machines are located near the generator and other translating devices—such, for example, as lights, small motors, &c.—are located at much greater distances—as, for example, on the higher floors of an office-building. Under the usual conditions of construction and operation the near-by motors will exert substantially the same compounding effect as the remote lamps, &c., when used alone. Furthermore, when both sets of translating devices are in use the degree of compounding that suffices for the adjacent motors is insufficient to overcome the drop between the generator and the remote lamps, &c., from which it follows that the latter do not receive sufficient current for satisfactory operation.

I am enabled by my present invention to so regulate the compounding of the generator as to provide the amount of current desired for each translating device or each set of such devices without any manipulation of the apparatus employed other than the opening and closing of the switches employed for cutting the translating devices into and out of circuit.

Figure 1:
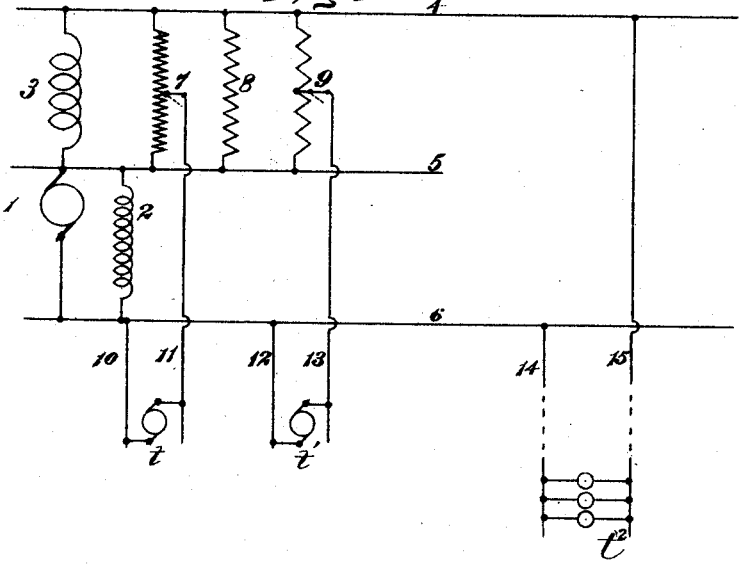
Figure 2:
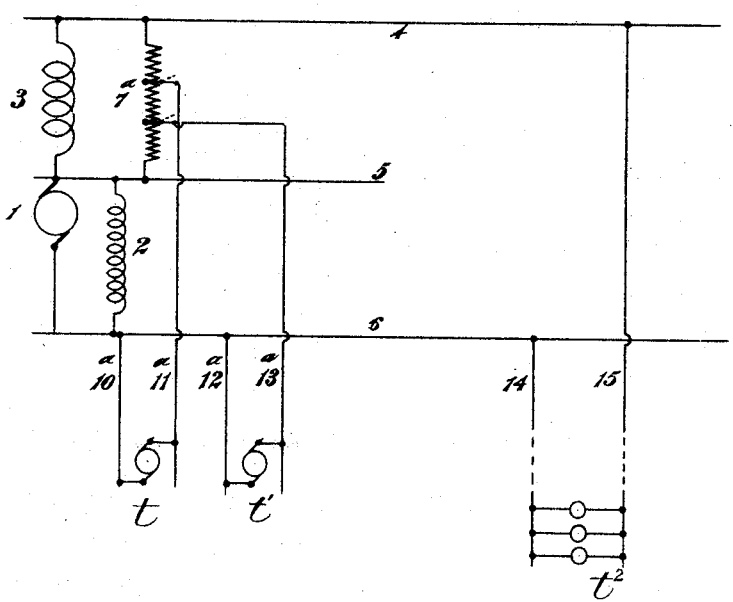

In the accompanying drawings, Figure 1 is a diagram of a system of distribution constructed and arranged in accordance with my invention, and Fig. 2 is a similar diagram of a modification.

In Fig. 1 the generator 1 is shown as provided with a shunt-winding 2 and a series winding 3, connected to bus-bars 4, 5, and 6 in the usual manner. 7, 8, and 9 are resistance-coils connected between the bus-bars 4 and 5 and therefore in shunt to the series winding 3 of the generator 1. These shunts are shown in the form of coils; but they may have any form that is found to be convenient or desirable in practice. I desire it also to be understood that only one such shunt is necessary. The three shown are intended to be of different degrees of resistance; but the number of shunts and the resistance of each is a matter to be determined by the particular system employed and the regulating effect desired. 10 and 11 are feeding-conductors connected, respectively, to the bus-bar 6 and the middle point of the shunt 7, these feeding-conductors being intended to supply one or more motors or other translating devices $t$. 12 and 13 are similar feeding-conductors connected, respectively, to the bus-bar 6 and the middle point of the shunt 9 for the purpose of supplying one or more motors or other translating devices $t'$. 14 and 15 are feeding-conductors connected, respectively, to the bus-bars 6 and 4 for the purpose of supplying translating devices $t^2$ more or less remote from the generator 1.

While I have shown the feeding-conductors 11 and 13 as respectively connected to the middle points of shunts 7 and 9, I desire it to be understood that they may be connected to other points intermediate the terminals of these shunts, if desired, for the purpose of securing different results as regards the compounding of the generator.

In Fig. 2 I have shown a generator 1 connected to the bus-bars 4, 5, and 6 and provided with a shunt-winding 2 and series winding 3, all the said parts being similar to or the same as those shown in Fig. 1. In this case, however, I have shown a single resistance-shunt $7^a$ connected between the bus-bars 4 and 5 and two pairs of feeding-conductors $10^a$ $11^a$ and $12^a$ $13^a$, the conductors $11^a$ and $13^a$ being connected to different points in the resistance-shunt $7^a$. The feeding-conductors 14 and 15 are connected to the bus-bars 6 and 4 in the same manner and for the same purpose as the corresponding conductors in Fig. 1.

In the system shown in Fig. 1 if we assume that the shunt 7 is the only one employed and that there are no translating devices $t$ in circuit and assume, further, for the purposes of illustration that the resistance of the shunt is twice that of the series winding 3 then the current passing through the series winding will be approximately two-thirds of the amount supplied to the translating devices $t^2$. If the translating devices $t^2$ be cut out and the translating device or devices $t$ be connected in circuit, the other conditions being the same as above described, the current passing through the series winding will be approximately one-third that supplied to the translating device or devices $t$. If the translating devices $t$ and $t^2$ be in circuit, substantially one-half of the current supplied by the generator-armature will traverse the series winding, thus serving to overcompound the generator sufficiently to supply the remote translating devices with the necessary amount of current. It will be understood without further description that the employment of additional shunts or a shunt of different resistance from that indicated above will result in a different compounding of the generator, and consequently substantially any desired regulation of the generator may be secured by providing the proper shunts and making the necessary connections between the same and the feeding-conductors.

In Fig. 2 assuming for the purposes of illustration that the resistance of the shunt $7^a$ is three times that of the series winding 3 and that the shunt is divided into thirds by the connections of the conductors $11^a$ and $13^a$ therewith if the translating devices $t^2$ only are in circuit the current traversing the series winding of the generator will be approximately three-fourths that supplied to the translating devices, with the translating device or devices $t$ only in circuit substantially one-half the current taken by the translating devices will pass through the series winding, with the translating device $t'$ only in circuit the current traversing the series winding will be approximately one-fourth that passing through the translating devices, and with all the translating devices in circuit the current traversing the series winding will be materially greater than when the translating devices $t^2$ are the only ones in circuit.

It will be understood from the foregoing description that the shunts and their connections may be widely varied as regards both specific structure and arrangement without departing from the invention. I do not, therefore, limit myself to any specific construction or arrangement further than limitations are imposed by the state of the art.

I claim as my invention—

1. In a system of electrical distribution, the combination with a compound-wound direct-current generator, of one or more pairs of feeding-conductors connected in the usual manner to said generator, a shunt to the series winding of the generator and one or more pairs of feeding-conductors connected to the armature-terminal that is opposite the series-winding connection and to the shunt at a point intermediate its terminals.

2. In a system of electrical distribution, the combination with a compound-wound direct-current generator, of feeding-conductors connected in the usual manner to the generator for supplying relatively remote translating devices, a shunt to the series winding of the generator and feeding-conductors connected to an intermediate point in the shunt and to the terminal of the generator that is opposite the series-winding connection for supplying translating devices that are relatively near the generator.

3. In a system of electrical distribution, the combination with a compound-wound direct-current generator, of feeding-conductors connected to the generator in the usual manner for supplying one or more translating devices or one or more sets of translating devices, a shunt to the series winding of the generator and one or more pairs of feeding-conductors connected to the terminal of the generator-armature opposite that to which the series winding is connected, and to the shunt at a point or points intermediate its ends.

4. In a system of electrical distribution, the combination with a compound-wound direct-current generator, of feeding-conductors connected to the generator in the usual manner, one or more shunts to the series winding of the generator and one or more pairs of feeding-conductors, one feeder of each pair being connected to an intermediate point in the corresponding shunt and the other to one of the terminals of the generator.

5. In a system of electrical distribution, the combination with a direct-current generator, of feeding-conductors connected to the generator in the usual manner, a shunt to the series winding of the generator and a pair of feeding-conductors one of which is connected to substantially the middle point of said shunt and the other to one of the terminals of the generator.

6. The method of regulating a compound-wound direct-current generator which consists in providing one or more shunts to the series field-magnet winding of the generator and providing a path for current between the terminal of the generator opposite that to which the series winding and the shunt or shunts are connected and such point or points in the shunt or shunts as will effect the degree of compounding desired.

In testimony whereof I have hereunto subscribed my name this 2d day of August, 1898.

BENJ. G. LAMME.

Witnesses:
WESLEY G. CARR,
H. C. TENER.